May 10, 1960    E. N. SHAWHAN    2,936,096
FUEL DISPENSING SYSTEM
Filed Feb. 21, 1958
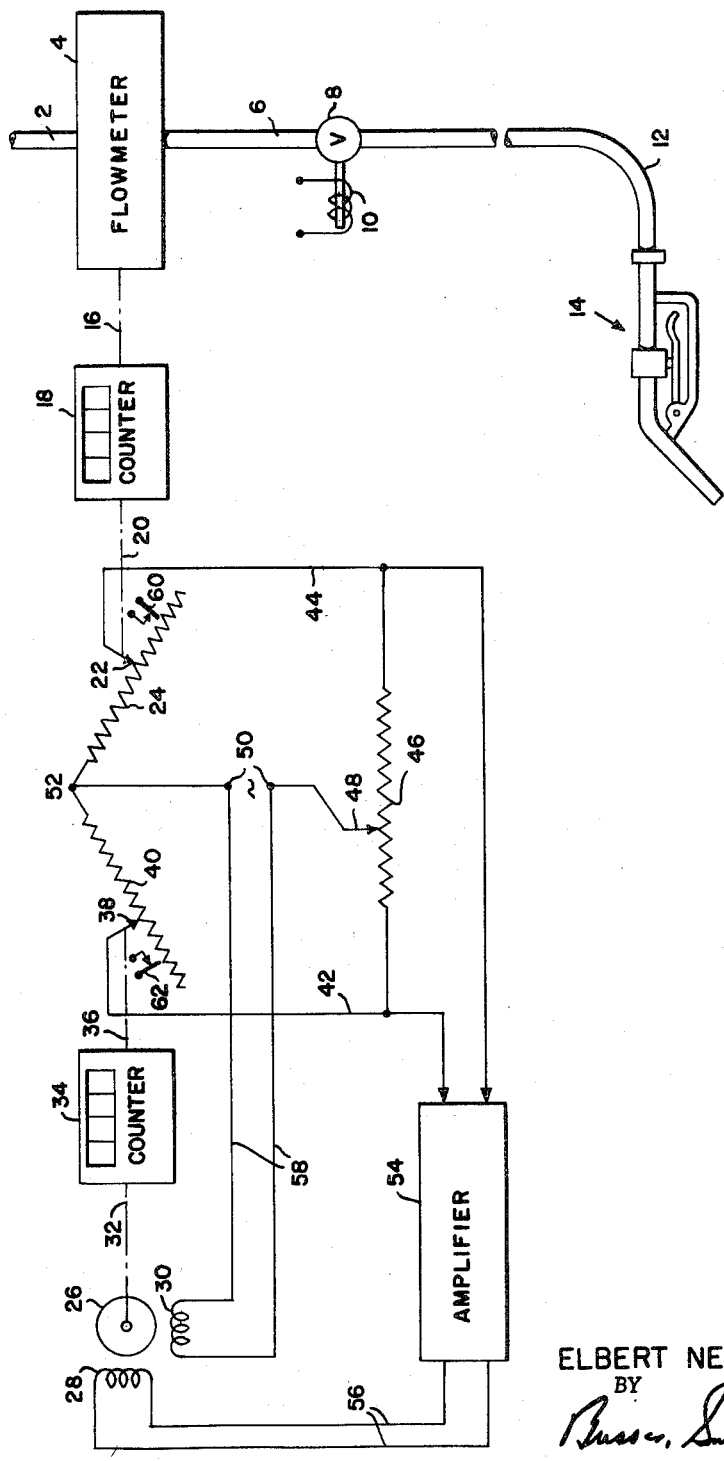
INVENTOR.
ELBERT NEIL SHAWHAN
BY
ATTORNEYS United States Patent Office 2,936,096
Patented May 10, 1960

2,936,096

FUEL DISPENSING SYSTEM

Elbert Neil Shawhan, Newton Square, Pa., assignor to Sun Oil Company, Philadelphia, Pa., a corporation of New Jersey Application February 21, 1958, Serial No. 716,758

2 Claims. (Cl. 222—14)

This invention relates to a fuel dispensing system and has particular reference to a gasoline "pump" in which determination of price is effected electrically, rather than mechanically as at the present time.

Present gasoline dispensing pumps are particularly complicated by reason of the presence of variators for computation of the total price of fuel delivery. Such variators are preset for the unit price (price per gallon) and receive as input the rotations of a flowmeter as the measure of fuel delivered. They then compute and exhibit the total price of a sale. Requirements of high accuracy are imposed by law, and it has been generally assumed that conventional electrical calculating devices unless of digital type would be too inaccurate to satisfy these requirements.

It is the object of the present invention to provide a fuel dispensing system of an electrical analog type which may be relied upon for high accuracy of calculation of prices. The system is in part mechanical but involves in its mechanical aspects nothing more than counters of simple type which exhibit the total volume delivered and the price. The unit price may be set into the apparatus to a degree of precision satisfying all requirements. The electrical system comprises conventional and inexpensive elements.

The foregoing general object as well as other objects relating to details of construction and operation will become apparent from the following description, read in conjunction with the accompanying drawing, in which the figure indicates in diagrammatic form the mechanical and electrical elements involved in the invention.

The fuel delivery line from the fuel pump is indicated at 2. As is usual, this pump is motor driven and provided with a by-pass for flow so that the pump may be operated even though delivery is stopped by the use of one or more shut-off valves, one of these being at the conventional nozzle. The fuel is delivered from the line 2 through a conventional flowmeter 4 from which it passes through a line 6 controlled by a solenoid valve 8 to the usual hose 12 provided with the valved nozzle 14. While not essential for the present invention, the valve 8 may be controlled by a solenoid 10 in an arrangement such as is disclosed in my copending application, Serial No. 716,-759, filed February 21, 1958. As disclosed in said application, a valve corresponding to 8 which is normally closed but opened upon energization of the solenoid 10 effects control to shut off the flow when the fuel level in the receiving tank rises to a predetermined extent detected by a capacitance provided in the delivery nozzle, the capacitance having an increase in its capacity value due to the action of the fuel as a dielectric between suitable plate elements. When the fuel in the receiving tank reaches a critical level the solenoid 10 is deenergized to close the valve 8 despite the continued open condition of the valve provided in the nozzle.

In accordance with the present invention the output shaft from the flowmeter drives through mechanical connections indicated at 16 a counter 18 to give a direct visible indication of the gallons and fractions of gallons of fuel delivery. An extension 20 of the connections 16 is arranged to vary an impedance in an impedance bridge which may take various forms. As specifically illustrated, these connections 20 drive the movable contact 22 of a precision potentiometer 24 which may be of the multiple turn precision type presently available. As will become clearer hereafter, the potentiometer illustrated as constituting the impedance might well be replaced by a variable condenser also having precision characteristics. The impedance, whatever type is used, should vary linearly with the displacement of the driving connection 20, so that its value measured from its initial end or setting will be at all times proportional to the gallons of fuel delivered.

A two-phase motor 26 having conventional field windings 28 and 30 drives through mechanical connections at 32 a counter 34 which may also be of conventional type and which is arranged to exhibit the total price involved in a sale. Extension connections 36 from the drive connections 32 serve to vary linearly an impedance in the same fashion as the connections 20 previously described, and while this impedance may also take various forms, it is illustrated as involving a precision potentiometer 40 the movable contact 38 of which is driven by the connections 36. Here again linearity is required so that the resistance, or more generally the impedance, has a value measured from one end or from a zero setting proportional to the price exhibited by the counter 34.

Electrical connections 42 and 44 respectively join the contacts 38 and 22 to the opposite terminals of the resistance 46 of another precision potentiometer the movable contact of which is indicated at 48. Alternating current supply terminals are indicated at 50 and are connected respectively to the contact 48 and to the junction 52 between the potentiometers 24 and 40. The usual commercial 60 cycle frequency supply may be used here. The bridge circuit thus provided delivers its output to a high gain amplifier 54 having a power output through connections 56 sufficient to energize the motor winding 28. The other winding 30 is connected through leads 58 to the alternating current supply terminals 50. The arrangement shown provides reversal of the motor 26 depending upon the side on which the bridge is unbalanced, the motor having a rest position when balance of the bridge occurs. Damping arrangements may be provided in the usual fashion to prevent hunting of the motor.

The settings of the movable contact 48 may be calibrated in terms of the unit price per gallon of the fuel, and it will be evident that the arrangement is such that the motor will come to rest only when the impedances between the movable contacts and the junction 52 bear ratios proportional to the portions of the resistance 46 on opposite sides of the movable contact 48. Thus the gallon indication is in effect, multiplied by the unit price to provide a price reading on the counter 34, the linear relationships involved and which have been described effecting this result. As fuel delivery takes place and the contact 22 moves proportionately, the motor 26 will correspondingly move the contact 38. Change of unit price requires only readjustment of the contact 48.

Directions given to an attendant at the gasoline station usually ask either for filling of the tank, the delivery of a particular number of gallons, or the delivery of sufficient gallons to reach a certain price. Automatic stopping upon filling of the tank is accomplished by closure of the valve 8 through the use of the system disclosed in my prior application referred to above. To stop the operation upon the attainment of delivery of a certain number of gallons, there may be provided a switch 60 adjustable along the path of movement of the contact 22 and arranged to be opened when engaged by this contact. The switch 60 may be in series with the solenoid 10 to open its circuit and thereby effect closing of the valve 8.

Similarly, an adjustable switch 62 may be set along the path of movement of contact 38 to be opened when a predetermined amount is registered on the counter 34. This switch also may be arranged to open the circuit of the solenoid 10, being in series with switch 60 and the solenoid. The switches 60 and 62 may, of course, be mechanically associated with the respective counters 18 and 34 so as to be opened when the counters attain predetermined values.

It will be evident from the foregoing that a simple, reliable and accurate system is provided for computing price and for effecting stoppage of delivery upon specified conditions. Variations in details will be evident. It has already been mentioned that the impedances at 24 and 40 may be provided by variable capacitors, and the same may be true in the case of the price setting impedances at opposite sides of the connection 48. A pair of capacitors having 180° difference in their settings may be adjusted by a common shaft to provide an impedance ratio corresponding to the unit price.

What is claimed is:

1. A fuel dispensing system comprising a dispensing conduit including a flowmeter; a first impedance varied by said flowmeter, means responsive to a predetermined value attained by said first impedance, means controlled by the response of the last-mentioned means operable to interrupt flow through said conduit, a reversible motor, a second impedance varied by said motor, means providing third and fourth impedances having an adjustable ratio, said impedances being connected to form a balanceable bridge; means for exciting said bridge, means amplifying the output of said bridge to effect drive of said motor to produce a ratio of said first and second impedances equal to the adjusted ratio of said third and fourth impedances, and a counter driven by said motor to exhibit a reading proportional to the value of said second impedance.

2. A fuel dispensing system comprising a dispensing conduit including a flowmeter; a first impedance varied by said flowmeter, a reversible motor, a second impedance varied by said motor, means providing third and fourth impedances having an adjustable ratio, said impedances being connected to form a balanceable bridge; means for exciting said bridge, means amplifying the output of said bridge to effect drive of said motor to produce a ratio of said first and second impedances equal to the adjusted ratio of said third and fourth impedances, means responsive to a predetermined value attained by said second impedance, means controlled by the response of the last-mentioned means operable to interrupt flow through said conduit, and a counter driven by said motor to exhibit a reading proportional to the value of said second impedance.

References Cited in the file of this patent

UNITED STATES PATENTS

| | | |
|---|---|---|
| Re. 23,844 | Condon | June 29, 1954 |
| 1,775,293 | Pfening et al. | Sept. 9, 1930 |
| 2,423,540 | Wills | July 8, 1947 |
| 2,675,510 | Belcher | Apr. 13, 1954 |
| 2,681,564 | Jeromson et al. | June 22, 1954 |
| 2,743,340 | Zoltanski | Apr. 24, 1956 |
| 2,761,043 | Larson | Aug. 28, 1956 |